(12) United States Patent
Oh

(10) Patent No.: US 6,775,379 B1
(45) Date of Patent: Aug. 10, 2004

(54) METHOD FOR AUTOMATIC INPUT AND TRANSMISSION OF PASS WORD IN USING TELEPHONE SET

(75) Inventor: Dae Sub Oh, Taegu-shi (KR)

(73) Assignee: LG Electronics Inc., Seoul (KR)

( * ) Notice: Subject to any disclaimer, the term of this patent is extended or adjusted under 35 U.S.C. 154(b) by 609 days.

(21) Appl. No.: 09/721,641

(22) Filed: Nov. 27, 2000

(30) Foreign Application Priority Data

Nov. 30, 1999 (KR) ........................................ 1999/53940

(51) Int. Cl.$^7$ .......................... H04M 1/00; H04M 3/00; H04M 1/66; H04M 3/42
(52) U.S. Cl. ............. 379/355.07; 379/199; 379/207.13; 379/357.05; 379/93.02; 455/411; 455/552
(58) Field of Search ................. 379/188, 194, 379/195, 199, 200, 207.13, 207.14, 216.01, 355.02, 355.07, 356.01, 357.05, 93.02, 93.03, 93.12; 455/410, 411, 552

(56) References Cited

U.S. PATENT DOCUMENTS

| | | | |
|---|---|---|---|
| 5,276,729 A | * | 1/1994 | Higuchi et al. ............. 455/564 |
| 5,295,181 A | * | 3/1994 | Kuo ....................... 379/100.07 |
| 5,513,013 A | * | 4/1996 | Kuo ........................... 358/448 |
| 6,098,055 A | | 8/2000 | Watanabe ..................... 705/73 |
| 6,138,005 A | | 10/2000 | Park ........................... 455/411 |
| 6,178,236 B1 | | 1/2001 | Jreig et al. .................. 379/188 |
| 6,206,283 B1 | | 3/2001 | Bansal et al. ............... 235/379 |
| 6,574,480 B1 | * | 6/2003 | Foladare et al. ............ 455/458 |

* cited by examiner

*Primary Examiner*—Binh Tieu
(74) *Attorney, Agent, or Firm*—Fleshner & Kim, LLP

(57) ABSTRACT

A method for automatic input and transmission of a pass word when using a telephone set permits a simple pass word input by using only one pass word button when different pass words are used for various service fields or operations mode. The method for input and transmission of pass words can include performing a set-up-mode by using the single pass word button and storing different telephone numbers and pass words for the telephone numbers, dialing one of the telephone numbers, and pressing the single pass word button if a message requiring pass word input is received (e.g., output by the dialed telephone number upon connection). Preferably, automatic transmission of the pass word for the dialed telephone number is performed responsive to the pass word button in off-hook operations, and entry of telephone numbers, which require pass words, and each corresponding pass word is performed responsive to the pass word button in on-hook operations.

11 Claims, 3 Drawing Sheets

METHOD FOR AUTOMATIC INPUT AND TRANSMISSION OF PASS WORD IN USING TELEPHONE SET

BACKGROUND OF THE INVENTION

1. Field of the Invention

The present invention relates to a telephone set, and more particularly, to a method for automatic input and transmission of a pass word in using a telephone set.

2. Background of the Related Art

Recently, as communication equipments and networks are developed, wireless communication systems (e.g., mobile stations and the like) are widespread, and used in a variety of service fields, such as application and forwarding of civil affairs documents by using a telephone system and home banking. Generally, a pass word is required for every service field of the telephone set. Although there are personal differences, most people set different pass words for different service fields. When different pass words are set for different service fields, there are cases where users experience difficulty in actual service field uses because the users can not remember what pass word was set for each service field. FIG. 1 illustrates a block diagram showing an automatic answering telephone set in a related art wired telephone system.

As shown in FIG. 1, an automatic answering telephone set in the related art wired telephone system is provided with a microphone 11 for converting a speech signal into an electrical signal, a microphone amplifier 12 for amplifying the electrical signal from the microphone 11, and a speech processing part 16 for processing a signal received through a telephone line into a speech signal or processing a speech signal for forwarding through the telephone line. A CODEC (Coder-Decoder) 13 is for converting an analog signal, which is either received through the microphone amplifier 12 or processed at the speech processing part 16, into a digital signal, or for converting a digital signal to be forwarded to the speech processing part 16 into an analog signal. A speaker amplifier 14 is for amplifying a signal received through the telephone line and processed into the speech signal at the speech processing part 16, or the analog signal from the CODEC 13. A speaker 15 converts the electrical signal amplified through the speaker amplifier 14 into an acoustic pressure for hearing by people. A DSP 18 connected to the CODEC 13 processes the digital signal, and a RAM 19 connected to the DSP 18 is for storing digital signals of forwarding or receiving message recording. A ROM 20 connected to the RAM 19 is for storing a speech guidance bell sound and the like, and a key pad 17 is for selecting various functions and operations of the telephone set. A main wire controller 21 is for on/off hooking the main wire under the control of a CPU 23. A ring processing part 22 is for receiving a ring through the main wire for transmission to the CPU 23, and the CPU 23 is for controlling the automatic answering operation of the automatic answering telephone set and all its functions.

The operation of the related art automatic answering telephone set shown in FIG. 1 will now be described. FIG. 2 illustrates an operation flow chart showing a method for performing a pass word input into the related art telephone set. As an example, a case of VMS (Voice Mailing System) in the related art wire telephone system will now be described.

As shown in FIG. 2, in an off-hook state made by the main wire controller 21 in step ST1, a telephone number is dialed for the VMS service in step ST2. Then, in step ST3 the telephone system outputs a message that requires input of a pass word, which can be either in characters on an LCD in the telephone set, or in a guidance speech, such as "Please input a pass word", through the speaker 15. If the message for input of a pass word outputs in step ST3, control passes to step ST5 where the user should input the required pass word through the key pad 17. That is, since a general telephone set is not provided with a separate device for automatic input of the pass word, the user should input the pass word by hand by using the key pad 17 on the telephone set in step ST5. For example, when one user uses many different pass words for a mobile station, telephone banking, and beeper and the like, there are many cases when the user forgets the pass word, and experiences difficulty in using the services. Thus, in the related art telephone, it is required that the user manage each of the pass words.

If it is determined in step ST3 that there is no pass word input within a preset time period since the output of the pass word input message or the pass word input message is not output, control passes to step ST4 where a general telephone communication function is conducted. In this instance, there are even cases when no general telephoning is allowed to occur in step ST4 for certain kinds of pass words. In cases where no generate telephoning is allowed in step ST4 when no pass word is input in step ST3, generally the calling session terminates. Upon reception of the pass word in step ST5, control passes to step ST6 where the function that required the pass word is performed.

Even in the mobile station (not shown), it is required to input a pass word when a stored telephone number is searched for or a message reception box is managed. Thus, the mobile station requires a pass word for each operation mode. If there is only one pass word for all the services or operation modes, there are still cases when the one pass word is forgotten.

As described above, the related art telephone set and methods have various disadvantages. In the related art telephone, the user has to manage the pass words. Since the related art telephone set has no device for storing the pass words, it is difficult to manage remembering multiple pass words by the user. Further, even if it is intended to manage the pass words by using abbreviated dialing, it is highly susceptible that the users forget which button corresponds to which pass word, particularly, for old people or amnestic people.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a telephone set and a method for automatic input and transmission of a pass word in using a telephone set that substantially obviates one or more of the problems caused by limitations and disadvantages of the related art.

Another object of the present invention is to provide a method for automatic input and transmission of a pass word in using a telephone set, in which, when different pass words are used, a separate button for the pass words is provided for inputting the pass words by using the separate button, and transmitting automatically the pass words with the separate button.

Another object of the present invention is to provide a method for automatic input and transmission of telephone number pass words during telephone set set use in which, when different pass words are used depending on modes of use in a telephone set, a simple pass word input can be made by using only one pass word button, and a transmission can be made by using the same.

Another object of the present invention is to provide a method for automatic input and transmission of a pass word in using a telephone set that uses a single pass word button for entry/update of pass words and automatically transmits same upon depression of the pass word button in subsequent corresponding telephone operations.

To achieve at least these and other objects and advantages in a whole or in part and in accordance with the purpose of the present invention, as embodied and broadly described, a method for input and transmission of a pass word in using a telephone set is provided that includes initializing by using a pass word button to store different telephone numbers and corresponding pass words for the stored telephone numbers, dialing one of the stored telephone numbers, and pressing the pass word button if a message requiring a pass word input is received to automatically perform transmission of the pass word for the dialed telephone number.

To further achieve at least the above objects in a whole or in part and in accordance with the purpose of the present invention, as embodied and broadly described, a method for using a telephone is provided that includes operating a pass word button in a first mode to store different telephone number and pass word combinations, dialing one of the stored telephone numbers in a second mode and operating the pass word button in the second mode responsive to a message requiring pass word input and directly transmitting the pass word of the dialed telephone number and pass word combination.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
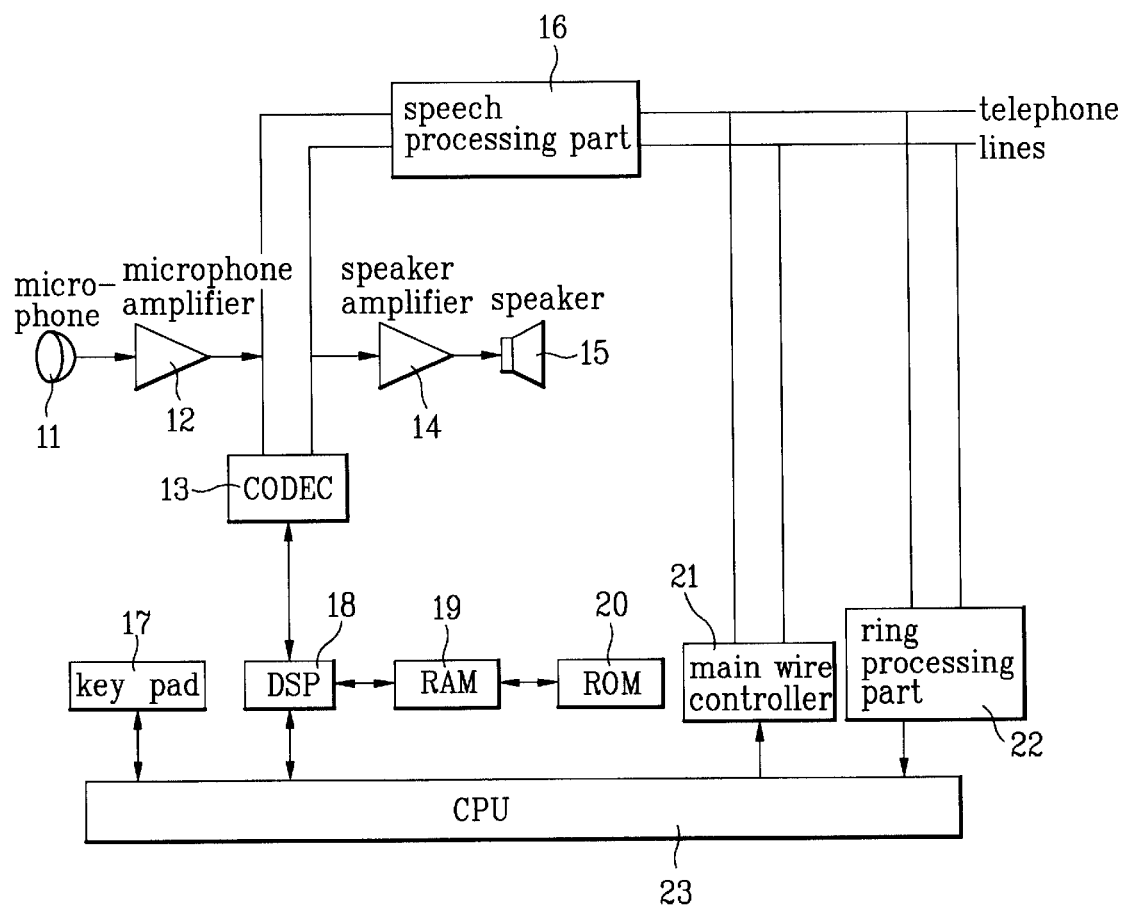
FIG. 1 illustrates a block diagram showing an automatic answering telephone set in a related art wired telephone system.
Figure 2:
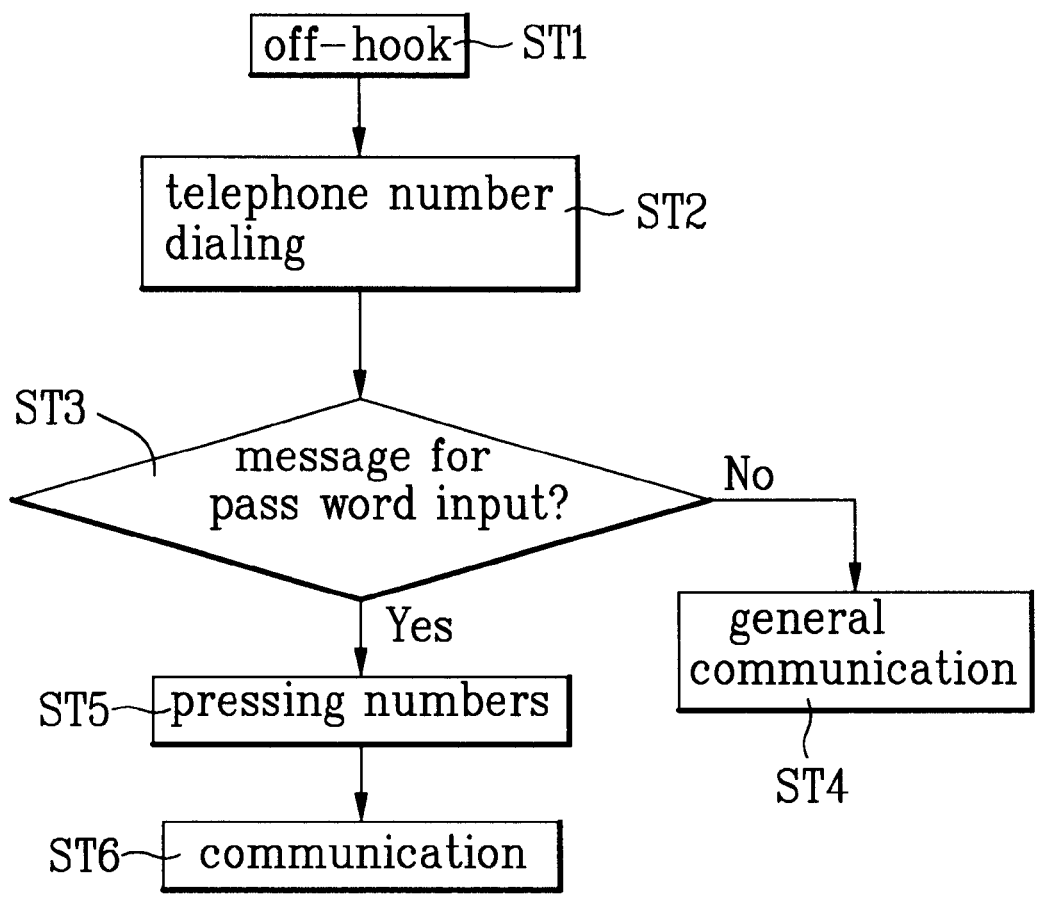
FIG. 2 illustrates an operation flow chart showing a method for making a pass word input into a related art telephone set.
Figure 3:
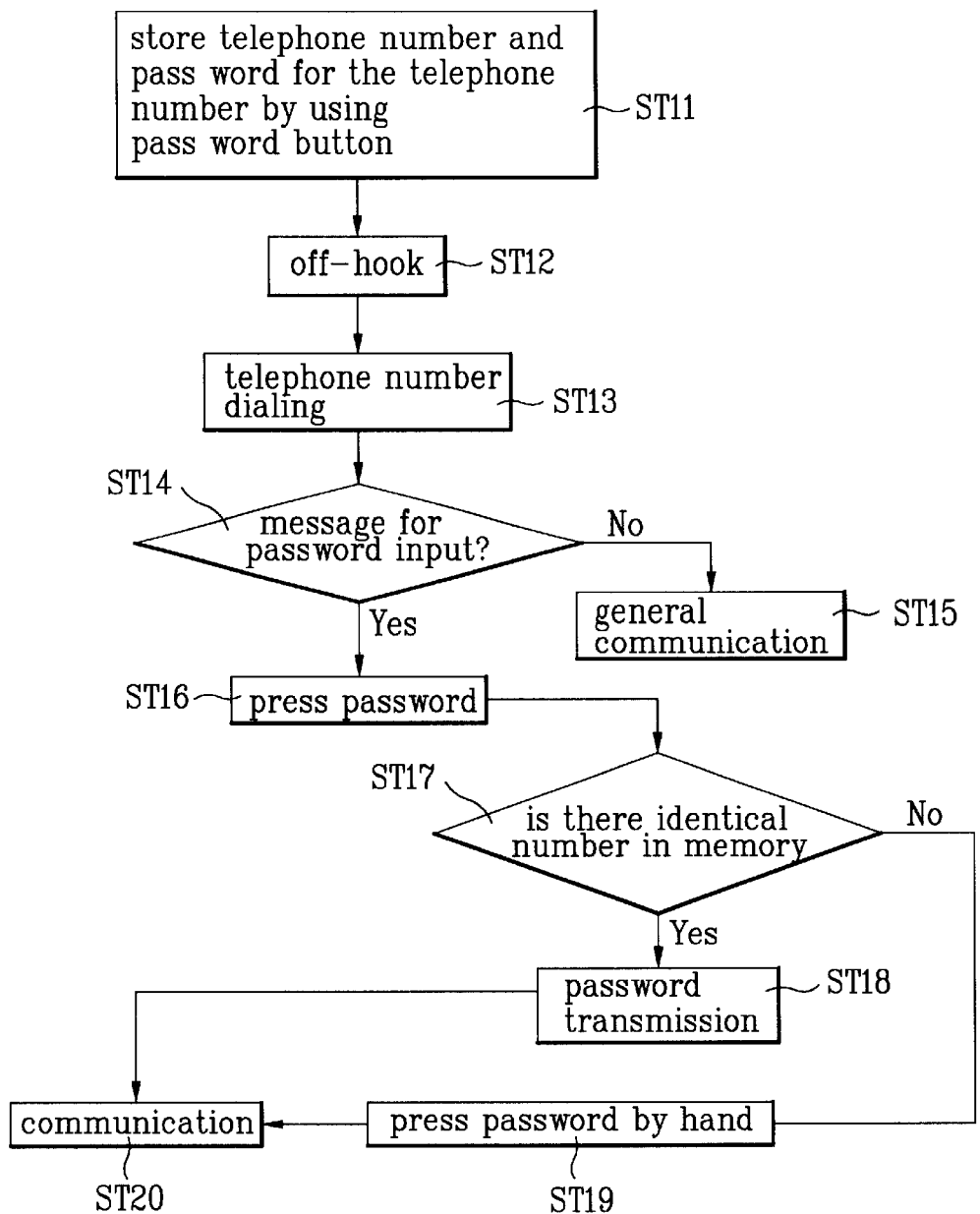
FIG. 3 is a diagram that illustrates an operations flow chart showing a method for making a pass word input into a telephone set in accordance with a preferred embodiment of the present invention.

FIG. 3 is a diagram that illustrates a flow chart showing a method for automatic pass word operations in a telephone set in accordance with a preferred embodiment of the present invention. In the preferred embodiment, pass words for respective telephone numbers are stored in a telephone set, a pass word button for automatic input (or output) is provided to the telephone set for automatic input (or output) of the stored pass words, and a CPU (e.g., CPU 23) is modified to control the telephone set such that a pass word storing mode and a pass word transmission mode are recognized. Preferably, the CPU understands that it is the pass word storing mode when the pass word button is pressed in a state where no telephone number is dialed. Further, the CPU preferably requires both the telephone number and a pass word for the telephone number are stored. However, the present invention is not intended to be so limited. For example, as another embodiment, it is possible that the above function is additionally provided to any one button on an existing key pad without provision of any separate pass word button, for use under the control of the CPU.

As shown in FIG. 3, a process starts when particular telephone numbers and corresponding pass words are stored in memories (e.g., 19 and 20 in the related art telephone set) at prescribed addresses of the telephone numbers in step ST11. That is, preferably after a pass word storing mode is set by pressing the pass word button in an on-hook state, a telephone number that requires the pass word is dialed (e.g., entered). After telephone number is thus dialed, the pass word button is pressed again, and next a pass word corresponding to the dialed telephone number is entered. To complete the entry, the pass word button is pressed again to generate a beep sound or a similar indication can be generated. The above process is preferably repeated, until all the telephone numbers, which require the pass words and corresponding pass words, are input. Upon finishing input of the telephone numbers and the pass words, the CPU (e.g., CPU 23 modified) preferably forms a table of the pass words and stores the table in memory at the prescribed addresses of the telephone numbers.

Operations following the storage of the telephone numbers that require pass words and the corresponding pass words will now be described. In step S12, the telephone set is taken off-hook. When the user dials a telephone number that requires a pass word in the off-hook state in step S13, a relevant telephone number managing station returns or provides a message for pass word input in characters or in a speech in step S14. When the message for pass word input is received, control passes to step S13 where the user presses the pass word button. When the user presses the pass word button in step S16, control continues to step S17 where the CPU preferably searches the memory (e.g., memories 19 and 20) in the telephone set for the dialed telephone number. If the dialed telephone number is determined to be stored in the memory in step S17, existence of a pass word related to the telephone number correspondingly stored in the memory (e.g., memories 19 and 20) is determined in step S18. Further, if the pass word related to the stored telephone number is determined in step S18, the pass word is transmitted automatically to an opposite party (i.e, the relevant telephone number managing station). Upon such automatic transmission of the pass word in step S18, a pass word protected communication is performed in step S20. If it is determined in step S17 that if there is no identical telephone number stored in the memory or no pass word related to the stored telephone number, the user may preferably press the pass word by hand in step S19 to proceed to step S20, where the protected communication is conducted. Alternatively, the stored (dialed) telephone number and the pass word existence in memory could be determined in step S17.

When the user dials a telephone number in step S13 that does not requires a pass word, it is determined in step S14 that no message for pass word was received and control continues to step S15. In step S15, the general communication is conducted.

As an example, assumed that a VMS telephone number is "019-123-4567" and has a VMS pass word of "1234", and a home banking telephone number is "111-1111" and has a home banking pass word of "2222". Input and set up of both pass words is conducted in an on-hook state. Therefore, if it is intended to input the pass word for the VMS, after a pass word input mode is set up by pressing the pass word in the on-hook state, "019-123-4567", which is the VMS telephone number, is pressed, and the pass word button is pressed again for storage of the telephone number in the memory (e.g., memories 19 and 20). Then, "1111", which is the pass word, is entered and the pass word button is pressed. In a case the pass word button is pressed after the pass word input, a 'beep' sound is emitted indicating input of the pass word is complete for the telephone number. However, the present invention is not intended to be so limited. Other indications can be used to inform the user that the telephone number and its corresponding pass word have be entered. After the input of the pass word for the VMS, which is the first number, the input of the pass word for a home banking, a second number, is preferably carried out in the same method. That is, identical to the first number input, after the pass word button is pressed in the on-hook state, "111-1111", which is a telephone number, is pressed. After the pass word button is pressed again, "2222", which is the pass word, is pressed, and the pass word button is pressed a third time. Thus, when a telephone call is made to the VMS, to the home banking, or the like, after a pass word for a relevant telephone number is inputted in advance, the following operations can be performed.

Continuing the example, if it is intended to make a telephone call to the home banking, a dialing to the home banking is made in an off-hook state, and an output of a banking system message requiring for a pass word input is waited for and then received. However, in a general communication, the message requiring pass word input is not received so that the general communication can be directly performed. When a telephone call is made to the VMS or the home banking, which requires a pass word identification, a message requiring a pass word is presented. Then, the user presses the pass word button upon reception of the message requiring the pass word. The user's telephone set preferably searches its memory (e.g., memories 19 and 20) for the telephone number identical to the dialed number. If there is the telephone number identical to the dialed telephone number in the memory in advance, a pass word for the telephone number is automatically transmitted to an opposite party. Thus, when different pass words are required, preferred embodiments according to the present invention permit simple pass word input by using only the one pass word button.

As described, preferred embodiments of a method for automatic input and transmission of a pass word in using a telephone set according to the present invention have various advantages. The pass word input by simply using only one pass word button without requiring user management of different pass words reduces or avoids difficulties coming from forgotten pass words, particularly for old people, amnestic people, or people with numerous pass words.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for automatic input and transmission of a pass word for a telephone set, comprising:

initializing by using a pass word button and storing different telephone numbers and corresponding pass words for each of the telephone numbers;

dialing one of the stored telephone numbers and pressing the pass word button responsive to a message requiring pass word input; and transmitting automatically the pass word for the dialed telephone number.

2. The method of claim 1, comprising:

transmitting the pass word for the dialed telephone number that is input by the user pressing keypad buttons manually responsive to the message requiring pass word input when the dialed telephone number is not said one of the stored telephone numbers or the pass word corresponding to the dialed telephone number is not previously stored.

3. The method of claim 1, wherein the initializing comprises:

pressing the pass word button a first time in an on-hook state, and inputting a first one of the stored telephone numbers that requires a first one of the corresponding pass words;

pressing the pass word button a second time after said input of the first stored telephone number and inputting the first corresponding pass word; and pressing the pass word button a third time after said input of the first corresponding pass word to generate an entry complete indication.

4. The method of claim 3, wherein the entry complete indication is a beep sound.

5. The method of claim 3, wherein the third press of the pass word button generates an audible alert.

6. The method of claim 3, comprising repeating the pressing the pass word button the first time through the pressing the pass word button the third time to store an additional one of the stored telephone numbers and an additional corresponding pass word.

7. The method of claim 1, wherein the automatic transmission comprises:

selecting one of the stored telephone numbers that is identical to the dialed telephone number;

determining existence of the corresponding pass word for the selected stored telephone number; and directly transmitting the determined corresponding pass word for the selected stored telephone number.

8. The method of claim 1, wherein the pass word button is one of an additional separate button provided on the key pad and any single button on a key pad in the telephone set having a pass word function provided thereto.

9. A method for using a telephone, comprising:

operating a pass word button in a first mode to store different telephone number and pass word combinations;

dialing one of the stored telephone numbers in a second mode and operating the pass word button in the second mode responsive to a message requiring pass word input; and directly transmitting the pass word of the dialed telephone number and pass word combination.

10. The method of claim 9, comprising:

transmitting the pass word of the dialed telephone number and pass word combination after manual entry at the telephone in the second mode if the dialed telephone number is not said one of the stored telephone number and pass word combinations or a pass word portion of the dialed telephone number and pass word combination is not stored.

11. The method of claim 9, wherein the first and second modes are on-hook and off-hook, respectively.

* * * * *